United States Patent
Polidor et al.

(10) Patent No.: US 11,112,238 B2
(45) Date of Patent: Sep. 7, 2021

(54) METHOD AND APPARATUS FOR SCANNING OBJECT

(71) Applicant: QUALITY VISION INTERNATIONAL INC., Rochester, NY (US)

(72) Inventors: Edward Tarry Polidor, Webster, NY (US); Jeffrey Blood, Victor, NY (US); Daniel C. Abbas, Webster, NY (US)

(73) Assignee: QUALITY VISION INTERNATIONAL INC., Rochester, NY (US)

(*) Notice: Subject to any disclaimer, the term of this patent is extended or adjusted under 35 U.S.C. 154(b) by 1041 days.

(21) Appl. No.: 15/164,955

(22) Filed: May 26, 2016

(65) Prior Publication Data

US 2017/0010087 A1     Jan. 12, 2017

Related U.S. Application Data

(60) Provisional application No. 62/189,268, filed on Jul. 7, 2015.

(51) Int. Cl.
*G01B 11/25* (2006.01)
*G01B 5/008* (2006.01)
(Continued)

(52) U.S. Cl.
CPC .............. *G01B 11/25* (2013.01); *G01B 5/008* (2013.01); *G01B 5/066* (2013.01); *G01B 11/0616* (2013.01); *G01B 11/245* (2013.01)

(58) Field of Classification Search
CPC . G06T 2207/20016; G06T 2207/10072; G06T 7/12; G06T 11/003; G06T 17/00;
(Continued)

(56) References Cited

U.S. PATENT DOCUMENTS

| 7,570,370 | B2 | 8/2009 | Steinbichler |
| 8,010,315 | B2 | 8/2011 | Wu et al. |

(Continued)

FOREIGN PATENT DOCUMENTS

| WO | 2009/048660 A2 | 4/2009 |
| WO | 2015/073590 A2 | 5/2015 |

(Continued)

OTHER PUBLICATIONS

Wang Y, Huang X, Lee CS, Zhang S, Li Z, Samaras D, Metaxas D, Elgammal A, Huang P. High Resolution Acquisition, Learning and Transfer of Dynamic 3-D Facial Expressions. InComputer Graphics Forum Sep. 1, 2004 (vol. 23, No. 3, pp. 677-686). Blackwell Publishing, Inc. (Year: 2004).*

(Continued)

*Primary Examiner* — Clifford Hilaire
(74) *Attorney, Agent, or Firm* — Andrew J. Anderson, Esq.; Harter Secrest & Emery LLP

(57) ABSTRACT

Method and apparatus for scanning surfaces of a three-dimensional object employ a first sensor to acquire first data points and a second sensor to acquire second data points. The first sensor has a relatively lower accuracy and faster data point acquisition rate than the second sensor, and the second data points are assigned a higher weighting than the first data points. A three-dimensional coordinate point cloud is generated based on the both the first and second data points and their respective weighting.

23 Claims, 1 Drawing Sheet

(51) Int. Cl.
*G01B 11/06* (2006.01)
*G01B 5/06* (2006.01)
*G01B 11/245* (2006.01)

(58) Field of Classification Search
CPC .......... G06T 17/10; G06T 2207/10028; G06T 2207/10101; G06T 7/11; G06T 7/13; G06T 7/155; G06T 7/168; G06T 7/30; G06T 7/521; G06T 7/55; G06T 7/62; G06T 11/005; G06T 11/00
See application file for complete search history.

(56) References Cited

U.S. PATENT DOCUMENTS

| | | |
|---|---|---|
| 8,581,162 B2 | 11/2013 | Campbell |
| 8,804,905 B2 | 8/2014 | Christoph et al. |
| 2003/0071194 A1* | 4/2003 | Mueller .................. G01B 11/00 250/208.1 |
| 2008/0101678 A1* | 5/2008 | Suliga .................. G06K 9/4671 382/132 |
| 2014/0193064 A1 | 7/2014 | Couse et al. |
| 2014/0267620 A1 | 9/2014 | Bridges |

FOREIGN PATENT DOCUMENTS

| | | |
|---|---|---|
| WO | 2015/099711 A1 | 7/2015 |
| WO | 2015/110163 A1 | 7/2015 |

OTHER PUBLICATIONS

Bickel B, Botsch M, Angst R, Matusik W, Otaduy M, Pfister H, Gross M. Multi-scale capture of facial geometry and motion. InACM transactions on graphics (TOG) Aug. 5, 2007 (vol. 26, No. 3, p. 33). ACM. (Year: 2007).*

Chekhlov D, Pupilli M, Mayol-Cuevas W, Calway A. Real-time and robust monocular SLAM using predictive multi-resolution descriptors. InInternational symposium on visual computing Nov. 6, 2006 (pp. 276-285). Springer, Berlin, Heidelberg. (Year: 2006).*

Zhang, S. and Huang, P., 2004, June. High-resolution, real-time 3D shape acquisition. In null (p. 28). IEEE. (Year: 2004).*

Goldenstein SK, Vogler C, Metaxas D. Statistical cue integration in dag deformable models. IEEE Transactions on Pattern Analysis and Machine Intelligence. Jul. 25, 2003(7):801-13. (Year: 2003).*

Malacara D, editor. Optical shop testing. John Wiley & Sons; Jul. 16, 2007. (Year: 2007).*

Wikipedia Website: http://en.wikipedia.org/wiki/Point_Cloud (3 pages) Dec. 7, 2014.

International Search Report and Written Opinion of the International Searching Authority dated Aug. 23, 2016 (15 pages).

* cited by examiner

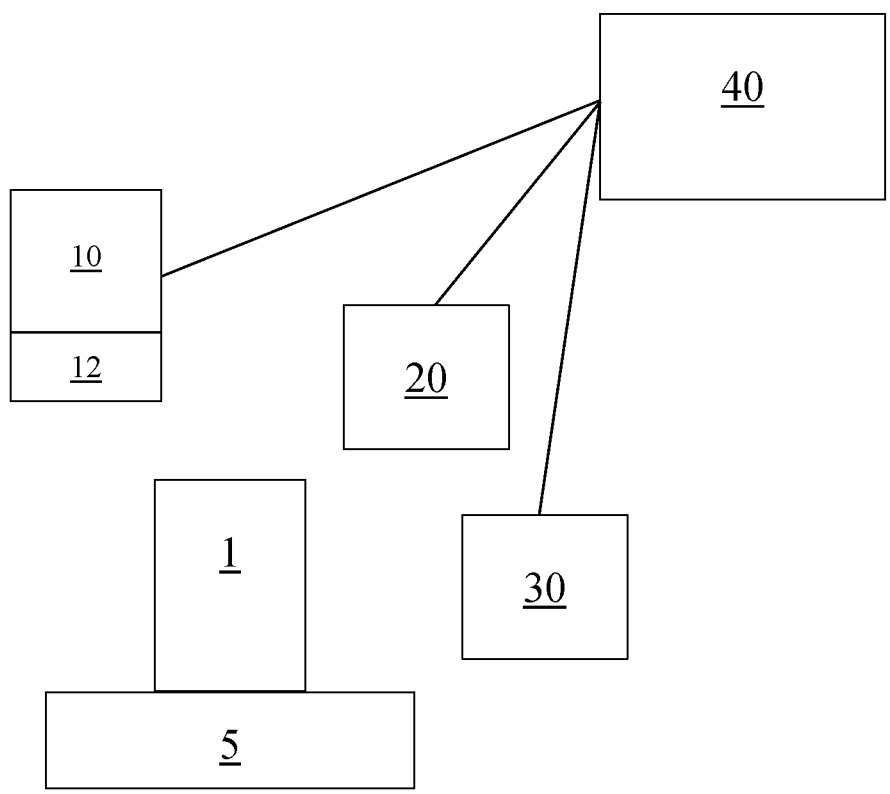

METHOD AND APPARATUS FOR SCANNING OBJECT

RELATED APPLICATIONS

This application claims the benefit of priority to U.S. Provisional Patent Application Ser. No. 62/189,268, filed on Jul. 7, 2015, the content of which is relied upon and incorporated herein by reference in its entirety.

STATEMENT REGARDING FEDERALLY SPONSORED RESEARCH OR DEVELOPMENT

None.

REFERENCE TO A "SEQUENCE LISTING"

Not applicable.

BACKGROUND OF THE INVENTION

This invention relates to a method and apparatus for scanning an object. The invention is especially useful for an optical measurement system that inspects an object.

Metrological machines are often employed for automated inspection of a manufactured object and for obtaining precise dimensional measurements of the manufactured object to ensure the object conforms to specifications.

One type of inspection device is optical three-dimensional (3D) area scanners. Optical 3D area scanners provide relatively simple and quick access to large 3D point clouds, thereby allowing real-time feedback on part geometry and comparison to design-intent drawings and files. However, current technologies for 3D area scanning may be adversely affected by surface finish, part geometry and feature size, resulting in a 3D point cloud with incorrect or insufficient information about various features of the part. This is further complicated when those various features of the part are of particular interest. Additionally, optical 3D area scanning devices are limited in how accurately they sense the features of the part, whereas it may be required to have information on portions of the part to a significantly greater degree of accuracy than provided by the area scanning device.

Another type of inspection device collects only one data point at a time. Examples of this type of device are the touch probes and optical image-processing devices. These devices are less affected than 3D area scanners by surface finish, part geometry and feature size. However, because they collect only one data point at a time, these devices result in relatively slow scans. Thus, for efficient part quality evaluation, these devices may only be used practically in local areas of particular interest. In other words, scanning the entire part with this type of device may be too slow, thus requiring one to compromise and omit some areas of the part.

One potential approach to address such drawbacks is to combine data sets acquired with two different sensors, wherein the data from the more accurate scanner replaces any data acquired with the less accurate sensor in the combined data set. As an example, point clouds are collected, analyzed and processed using two different sensors, and for portions of the point cloud containing redundant data, the "less accurate" data is discarded. However, the present inventors recognized that complimentary scanning technologies have different characteristics and generate different density 3D point clouds with different measurement uncertainties. Adopting information from one data set while disregarding the information of another is suboptimal in that information contained in the less accurate data set is completely ignored. While one data set is less accurate than the other data set, the less accurate data set typically has data from many more points on the measured object than the more accurate data set and can still provide useful information.

Another potential approach to address such drawbacks involves gathering a large data set using a low accuracy X-ray sensor and using a high accuracy sensor to determine several locations on the test object accurately. Then, the cloud of low accuracy data points are fit through the accurately determined points. The X-ray sensor is particularly inaccurate in determining the outer surface of a measured object; touch probes and optical image-processing sensors are designed to measure the surface. The present inventors recognized such an approach applied to other high speed scanners such as 3D area scanners is not optimal because, unlike an X-ray scanner, 3D area scanners are surface scanners. While not as accurate as the touch probe or optical image-processing sensor, the 3D area scanners do provide information about the surface of the measured object that should not be ignored. Further, each of the two sensing technologies has different characteristics (e.g. point density), and to force one to overlay another may result in important information being lost.

BRIEF SUMMARY OF THE INVENTION

This invention provides a method comprising:
  scanning surfaces of a three-dimensional object with a first sensor to acquire first data points representative of the scanned surfaces, and adding the first data points to a three-dimensional coordinate point cloud;
  scanning surfaces of the three-dimensional object with a second sensor to acquire second data points representative of the scanned surfaces, and adding the second data points to the three-dimensional coordinate point cloud;
  wherein the first sensor has a lower accuracy and a faster data point acquisition rate than the second sensor, and the second data points are assigned a higher weighting than the first data points; and
  basing the three-dimensional coordinate point cloud on weighted first and second data points.

The invention provides an apparatus comprising:
  a first sensor that scans surfaces of a three-dimensional object to acquire first data points representative of the scanned surfaces;
  a second sensor that scans surfaces of the three-dimensional object with a second sensor to acquire second data points representative of the scanned surfaces, wherein the first sensor has a lower accuracy and a faster data point acquisition than the second sensor; and
  a module that collects the first and second data points, adds the first and second data points to a three-dimensional coordinate point cloud, and bases the three-dimensional coordinate point cloud on a weighting of the first and second data points, with the second data points having a higher weighting than the first data points.

The first sensor may comprise an optical area sensor. The optical area sensor may comprise a camera and a fringe projector, a 3D laser scanner and/or an area LED scanner.

The second sensor may comprise an optical point or line sensor, such as a point scanning laser probe and/or a touch probe sensor.

The method may further comprise comparing the three-dimensional coordinate point cloud to a reference model and determining any deviations therebetween.

The three-dimensional object may be scanned with one of the sensors multiple times, with the acquired data points from each scan being added to the three-dimensional coordinate point cloud.

The three-dimensional object may be scanned with the first sensor, followed by scanning with the second sensor, or vice versa.

Only selected surfaces of the three-dimensional objects may be scanned with the second sensor, or the entire object may be scanned with the first and second sensors. The selected surfaces may include local portions of the object for which first data points potentially have low density or are lacking, such as local portions of the object including complex surface geometry.

The apparatus may further comprise a third sensor, and the method may further comprise scanning surfaces of the three-dimensional object with a third sensor to acquire third data points representative of the scanned surfaces, and adding the third data points to the three-dimensional coordinate point cloud, wherein the third sensor has a different accuracy and speed of data point acquisition than the first and second sensors, and the third data points are assigned a weighting based on the third sensor accuracy relative to the first and second sensors.

This invention also provides a method comprising:
scanning surfaces of a three-dimensional object with a second sensor to acquire pre-coating data points;
subsequently, coating the object and scanning surfaces of the coated object with the second sensor to acquire coated data points, and determining the thickness of the coating by comparing the pre-coating and coated data points;
subsequently, scanning surfaces of the coated three-dimensional object with a first sensor to acquire subsequent data points representative of the scanned surfaces, and adding the subsequent data points to a three-dimensional coordinate point cloud after subtracting the determined thickness of the coating,
wherein the first sensor has a lower accuracy and faster data point acquisition than the second sensor.

BRIEF DESCRIPTION OF THE SEVERAL VIEWS OF THE DRAWING(S)

FIG. 1 illustrates schematically an apparatus according to various embodiments.

DETAILED DESCRIPTION OF THE INVENTION

This invention provides improved 3D scanning methods, and apparatus for carrying out the methods. According to various embodiments, each of at least two different but complementary 3D scanning techniques generates 3D points. The 3D points from the at least two scanners are weighted differently, taking into account the accuracy of the respective 3D sensor, and are combined additively to supplement each other, yielding more accurate, complete 3D point clouds of scanned 3D objects, such as machined parts.

The method involves scanning surfaces of a 3D object with a first sensor to acquire first data points representative of the scanned surfaces, and adding the first data points to a 3D coordinate point cloud, and scanning surfaces of the 3D object with a second sensor to acquire second data points representative of the scanned surfaces, and adding the second data points to the 3D coordinate point cloud. The first sensor has a lower accuracy and a faster data point acquisition rate than the second sensor, and the second data points are assigned a higher weighting than the first data points. The resultant 3D coordinate point cloud is based on the weighted first and second data points.

This application is especially useful in the field of metrology. As recognized by those of ordinary skill in the art, two general types of "errors", that affect accuracy of the measured results, may be associated with measurement sensors: systematic errors and random errors. If multiple measurements are made with the same sensor under conditions that are maintained as similar as practical, generally, the mean of those measurements may still differ from the actual dimension being measured; this difference is due to systematic errors. Accordingly, well-designed systems have the capability to calibrate the sensors, thereby adjusting the measured and reported results to significantly reduce any such systematic errors. As an example, a sensor is often calibrated by using it to first measure a calibrated object whose dimensions have previously been precisely determined and then using physical adjustments and/or software compensation so that the sensor obtains measurements that have the same means as the known dimensions of the calibrated object, when repeated under conditions as similar as practical.

After the systematic errors have been obviated to the extent practical, the remaining scatter of repeated measurements under conditions that are as similar as practical is due to random errors. The method of this invention deals with treatment of data from different, multiple scanners that have differing random errors. For the method of this invention, any systematic errors in the sensors should be removed/minimized through the standard methods, such as calibration.

The various steps of this method may be performed in a variety of sequences. For example, the 3D object may be scanned with the first sensor, followed by scanning with the second sensor, or vice versa. As another example, the data points collected from the first and second sensors may be added to the 3D point cloud at various times. For example, the first data points may be added to the 3D point cloud immediately after the first sensor has completed a scan, or the first data points may be added in real-time, i.e., first data points are added as they are collected and while the first sensor is still executing its scan of the 3D object.

The 3D object may be scanned with any of the sensors multiple times. For example, as the first sensor acquires data points relatively quickly, more than one scan may be performed with this sensor, with the acquired first data points from each scan being added to the 3D coordinate point cloud. As an example, the object may be supported on a rotatable support, and the 3D object is scanned with the first sensor at multiple rotatable support positions.

More than two sensors may be employed. For example, surfaces of the 3D object may be scanned with a third, different sensor to acquire third data points representative of the scanned surfaces, and adding the third data points to the 3D coordinate point cloud. In this example, the third sensor has a different accuracy and speed of data point acquisition than the first and second sensors, and the third data points are assigned a weighting based on the third sensor accuracy relative to the first and second sensors.

A wide variety of sensors may be employed, including those that are commercially available.

The first sensor may be an optical area sensor. As one example, the optical area sensor may comprise at least one camera and a light source such as a fringe projector. The first sensor may be a laser scanner, such as line laser scanners that travel in at least a third direction (for example, along the Z-axis) so as to provide 3D laser scanning.

A first example is the Comet™ series of area scanners employing a blue light source from Steinbichler Optotechnik GmbH (Neubeurn, Germany), which is promoted as potentially capturing up to 16 million points/second. A second example is the ATOS™ series of scanners from GOM International AG (Widen, Switzerland) employing a blue light source. A third example is the ShapeGrabber™ automated 3D laser scanner systems available from ShapeGrabber (Ottawa, Canada), which may capture from 18,000 to over 100,000 points/second. Various ShapeGrabber™ automated 3D laser scanners are examples of systems including a rotatable support. A further example is 3D laser scanners available from Perceptron, Inc. (Plymouth, Mich., USA).

If desired, especially when scanning a reflective surface with an optical area sensor, the level of light projected on the object may be adjusted based on reflectivity of the surface being scanned, employing a commercially available "intelligent light control" system, such as the Comet 6™ series of fringe projector sensors from Steinbichler Optotechnik GmbH.

Accordingly, for objects with relatively simple geometries, or for which required tolerances are relatively low, such sensors are very useful for evaluating objects. However, for some 3D objects, such sensors may not provide sufficient data.

As an example, local portions of the 3D object may have a complex surface geometry. The data points from the first sensor may have too low density due to the limitations of the first sensor to scan adequately complex curves or other features. If local portions are hidden from the first sensor, first data points for such portions may be lacking altogether.

As another example, if a portion of the 3D object requires relatively high manufacturing tolerances, the first sensor may not have adequate accuracy to measure features requiring such high tolerances.

Examples of second sensors include optical point or line sensors, such as a point scanning laser probe and a touch probe sensor, including those that are commercially available. Scans may be performed with more than one of these types of second sensors. For example, one feature of the object may be best scanned with an optical point probe, whereas another feature may require a touch probe sensor. In such a case, data points from each of these second sensors are included for the 3D point cloud, with their appropriate weighting A first example is the combination of a 3D fringe projection scanning system as the first sensor and a point or line scanning confocal probe as the second sensor, for performing metrology, i.e., for comparing the 3D coordinate point cloud to a reference model of a manufactured part to confirm whether there are any deviations therebetween. The first and second scanners are calibrated relative to each other in the metrology system such that they are used to generate 3D point clouds in the same coordinate system. The fringe projection system scans a part to be measured and generates a large 3D point cloud quickly with a known accuracy of about 10 µm. In areas of the measured part that have surfaces that slope away from the scanner, and/or in areas shaded by other pieces of the measured part, this point cloud is sparse. Even though the system may generate a 3D best-fit through this point cloud, there are inaccuracies in the measurement in these areas.

The confocal probe, which is much slower than the first sensor but has a known accuracy of about 1 µm, may be used to supplement and/or improve the accuracy of the first data points of the fringe projection by scanning those areas of the part for which the fringe projection point cloud is sparse and inaccurate. The second data points obtained with the confocal probe are added to the point cloud generated from the first data points of the fringe projection sensor, but in this example, these second data points are given ten times the weight of the fringe projection data in the fit because they are ten times as accurate.

In this first example, the weightings of the first and second data points are proportional to the respective accuracies of the first and second sensors. However, it is not necessary that the weightings are proportional, only that the second data points are assigned a higher weighting than the first data points. In other words, the weighting may be set to a certain desired level, depending on the selection of the first and second sensors and depending on the specific object being evaluated.

Accordingly, the 3D point cloud is adjusted to obtain a best fit, the best fit including the weighted first and second data points. This resultant best fit 3D point cloud, containing both the first and second data points, may be compared to the reference model of the 3D object.

A second example is the case in which the uncertainties of the measurement of both the fast first sensor and the slow, more accurate second sensor vary across the measured 3D object, such as a manufactured part. In this example, first and second data points from small areas of the measured part are analyzed to determine the standard deviation of the measured data from each sensor within that local area. The first and second data points for that area are then weighted by the reciprocal of the standard deviation when combined with all the other data to determine the best fit to the measured part.

In both of these examples, the final fit is more heavily influenced by individual second data points from the more accurate scanner; however in areas of the part for which many more data points have been collected by the slower, less accurate first sensor, the far greater number of data points from the faster sensor will locally dominate the final fit. In this way the best capabilities of each scanner are combined to produce a final fit that is better than the fit that can be obtained with the fast scanner alone, and it is obtained far more quickly than it could be obtained with the slow scanner alone. Additionally, useful data points are not discarded.

The first and second data points may be combined in a variety of manners. As an example and illustrated in the second example, standard deviation values of the first and second data points may be determined, and the weighting of the first and second data points is then based on the reciprocal of the respective standard deviation value.

Generally, the less accurate first sensor is able to acquire data points at least ten times faster than the more accurate second sensor. Generally, the more accurate second sensor will have an accuracy at least five times that of the less accurate first sensor, and preferably at least ten times that of the less accurate first sensor.

Generally, the more accurate second sensor is able to acquire data points at a maximum of 15,000 points per second, although various sensors of this type have a maximum point acquisition lower than 5,000 points per second.

Generally, the less accurate first sensor is able to acquire data points at a rate of at least 18,000 points per second, and preferably at least 50,000 points per second. It will be appreciated that the speed of data acquisition may be affected by various factors, including surface color, reflectivity and geometry.

Also, accuracies may be affected by various factors including the field of view (FOV) being captured. For example, for an approximately 200 mm×200 mm FOV, the accuracies may range from 10 to 100 microns MPE (Maximum Permissible Error).

Another example of this invention involves evaluating 3D objects with a coating. For example, in scanning parts having highly reflective surfaces with an optical sensor, the surfaces may be coated with a diffuse material to reduce reflectivity, thereby adding some thickness to the part. This thickness is then subtracted from the measured data. This invention allows one to determine accurately the coating thickness.

Accordingly, for this third example, surfaces of the 3D object are scanned with the second sensor, such as a touch probe sensor, to acquire pre-coating data points. Subsequently, the object is coated to reduce reflectivity of the surfaces, and the same surfaces, now coated, are scanned with the second sensor to acquire coated data points. The thickness of the coating is determined by comparing the pre-coating and coated data points. Now, desired surfaces may be scanned with the quicker first sensor to acquire subsequent data points, which are added to the 3D point cloud after subtracting the determined thickness of the coating.

FIG. 1 illustrates an apparatus for carrying out various methods of this invention. The three-dimensional object 1 is placed on support 5. First sensor 10 and second sensor 20 are independently positionable with respect to object 1 and support 5 so that they may independently scan desired surfaces of object 1. For example, support 5 may be movable along one or more axes, and each of sensors 10 and 20 may be movable along one or more axes, so that they have access to desired surfaces to be scanned. Similarly, any additional sensors 30 are positionable with respect to object 1 and support 5 so they may independently scan desired surfaces of object 1. As previously mentioned, support 5 may be rotatable if it desired to perform multiple scans with sensor 10 at different rotational positions of object 1, or to assist in positioning object 1 with respect to any of the sensors. Sensor 10 may be provided with light adjustor 12 that adjust the level of light projected on object 1 based on reflectivity of the scanned surface, particularly when sensor 10 comprises a fringe projector system.

Sensors 10 and 20 are each in connection with module 40 that collects the first and second data points from the respective sensors, adds the first and second data points to a three-dimensional coordinate point cloud, and bases the three-dimensional coordinate point cloud on a weighting of the first and second data points, as previously described. Similarly, any third or additional sensor 30 is in connection with the module, such that the module collects the third or additional data points and adds them to the three-dimensional coordinate point cloud based on their assigned weighting.

While this invention has been illustrated and described in connection with certain embodiments, it will be apparent that this invention is capable of further modifications, alternatives and improvements which may subsequently made by those skilled in the art and which are also intended to be encompassed by the following claims.

The invention claimed is:

1. A method comprising:
   (a) scanning surfaces of a three-dimensional object with a first sensor to acquire first data points representative of surfaces that have been scanned with the first sensor, and adding the first data points to a three-dimensional coordinate point cloud;
   (b) scanning surfaces of the three-dimensional object with a second sensor to acquire second data points representative of surfaces that have been scanned with the second sensor, and adding the second data points to the three-dimensional coordinate point cloud;
   (c) wherein the first sensor has a lower accuracy and a faster data point acquisition rate than the second sensor, and the second data points are assigned a higher weighting than a weighting assigned to the first data points; and
   (d) basing the three-dimensional coordinate point cloud on weighted first and second data points.

2. The method of claim 1, wherein the first sensor comprises an optical area sensor or a 3D laser scanner.

3. The method of claim 2, further comprising adjusting a level of light projected on the three-dimensional object based on reflectivity of a surface being scanned.

4. The method of claim 3, wherein the optical area sensor comprises at least one of a camera and a fringe projector.

5. The method of claim 1, wherein the second sensor comprises at least one of an optical point or line sensor, a point scanning laser probe and a touch probe sensor.

6. The method of claim 1, further comprising comparing the three-dimensional coordinate point cloud to a reference model and determining any deviations therebetween.

7. The method of claim 1, wherein assigned weightings of the first and second data points are proportional to respective accuracies of the first and second sensors.

8. The method of claim 1, wherein standard deviation values of the first and second data points are determined, and assigned weightings of the first and second data points are based on the reciprocal of the respective standard deviation values.

9. The method of claim 1, wherein the three-dimensional object is scanned with the first sensor multiple times, with acquired first data points from each scan being added to the three-dimensional coordinate point cloud.

10. The method of claim 9, wherein the three-dimensional object is supported on a rotatable support, and the object is scanned with the first sensor at multiple rotatable support positions.

11. The method of claim 1, wherein the three-dimensional object is scanned with the first sensor, followed by scanning of the three-dimensional object with the second sensor, or the three-dimensional object is scanned with the second sensor, followed by scanning of the three-dimensional object with the first sensor.

12. The method of claim 1, wherein only selected surfaces of the three-dimensional object are scanned with the second sensor.

13. The method of claim 12, wherein said selected surfaces include local portions of the three-dimensional object for which first data points potentially have low density or are lacking.

14. The method of claim 12, wherein said selected surfaces include local portions of the three-dimensional object including complex surface geometry.

15. The method of claim 1, further comprising scanning surfaces of the three-dimensional object with a third sensor to acquire third data points representative of surfaces that have been scanned with the third sensor, and adding the third data points to the three-dimensional coordinate point cloud, (a) wherein the third sensor has a different accuracy and speed of data point acquisition than the first and second sensors, and the third data points are assigned a weighting based on the third sensor accuracy relative to the first and second sensors.

16. An apparatus comprising:
(a) a first sensor that scans surfaces of a three-dimensional object to acquire first data points representative of surfaces that have been scanned with the first sensor;
(b) a second sensor that scans surfaces of the three-dimensional object with a second sensor to acquire second data points representative of surfaces that have been scanned with the second sensor, wherein the first sensor has a lower accuracy and a faster data point acquisition than the second sensor; and
(c) a module that collects the first and second data points, adds the first and second data points to a three-dimensional coordinate point cloud, and bases the three-dimensional coordinate point cloud on weightings of the first and second data points, with the second data points having a higher weighting than a weighting of the first data points.

17. The apparatus of claim 16, wherein the first sensor comprises an optical area sensor.

18. The apparatus of claim 17, wherein the optical area sensor comprises at least one of a camera and a fringe projector.

19. The apparatus of claim 17, further comprising a light adjustor that adjusts a level of light projected on the three-dimensional object based on reflectivity of a surface being scanned.

20. The apparatus of claim 17, further comprising a rotatable support for the three-dimensional object, whereby the object is scanned with the first sensor at multiple rotatable support positions.

21. The apparatus of claim 16, wherein the second sensor comprises at least one of an optical point or line sensor, a point scanning laser probe and a touch probe sensor.

22. The apparatus of claim 16, wherein assigned weightings of the first and second data points are proportional to respective accuracies of the first and second sensors.

23. The apparatus of claim 16, further comprising a third sensor to acquire third data points representative of surfaces that have been scanned with the third sensor, wherein the module collects the third data points and adds them to the three-dimensional coordinate point cloud, wherein the third sensor has a different accuracy and speed of data point acquisition than the first and second sensors, and the third data points are assigned a weighting based on the third sensor accuracy relative to the first and second sensors.

* * * * *